Aug. 18, 1925.
G. PIERCE
AUTOMOBILE HEADLIGHT
Filed April 5, 1924
1,550,226
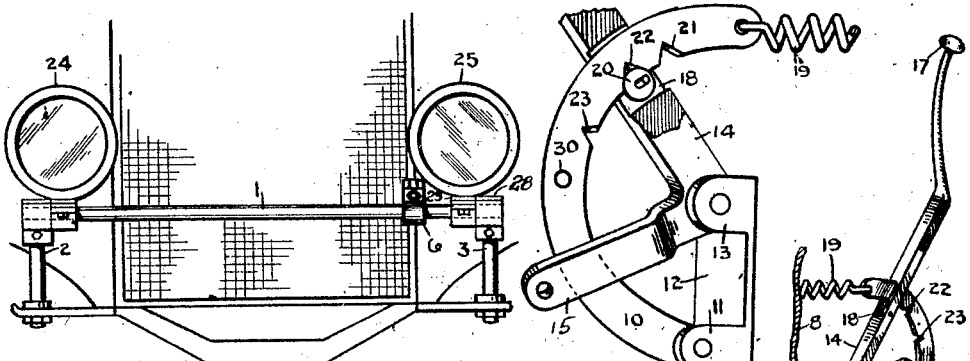
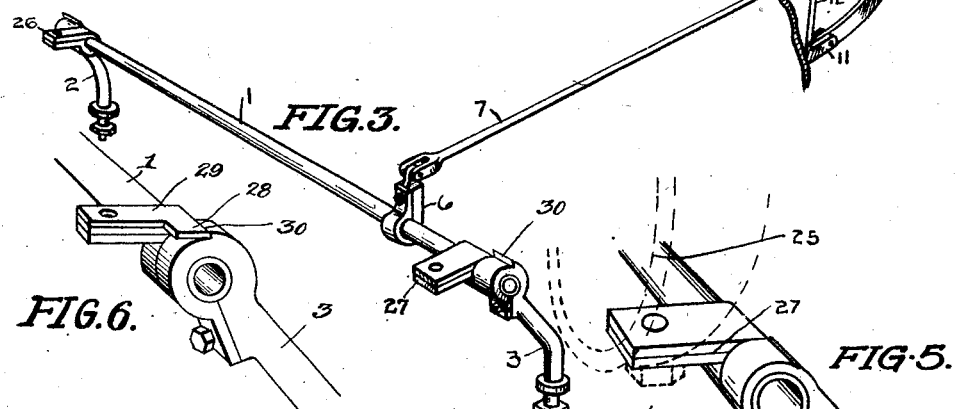
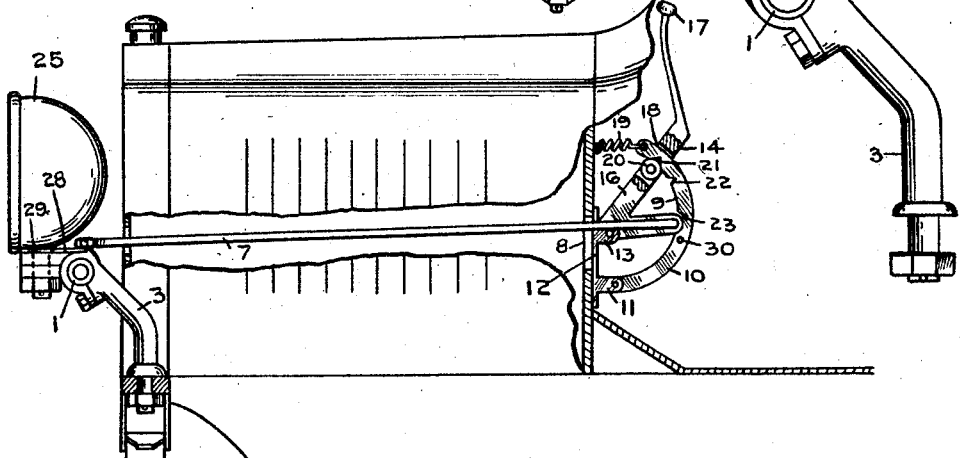
Inventor
G. Pierce
By E. J. Fetherstonhaugh
Attorney Patented Aug. 18, 1925.

1,550,226

UNITED STATES PATENT OFFICE.

GEORGE PIERCE, OF MONTREAL, QUEBEC, CANADA.

AUTOMOBILE HEADLIGHT.

Application filed April 5, 1924. Serial No. 704,450.

*To all whom it may concern:*

Be it known that I, GEORGE PIERCE, a subject of the King of Great Britain, and residing at the city of Montreal, in the Province of Quebec, in the Dominion of Canada, have invented new and useful Automobile Headlights, of which the following is the specification.

The invention relates to automobile headlights as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to simplify the mechanism in tilting or dipping headlights of motor cars, to enable the operator to graduate the tilt so that the different positions of the lamps will each be fixed in so far as rigidity is concerned; to eliminate expensive parts for the lighter makes of cars, and generally to provide a durable, serviceable and efficient means of avoiding the dangers incident to the glare of headlights.

In the drawings, Figure 1 is a front view of the engine hood and radiator casing of a motor car showing the invention applied thereto.

Figure 2 is a longitudinal sectional view of the hood, showing the operating connections of the tilting mechanism.

Figure 3 is a perspective detail of the mechanism.

Figure 4 is an enlarged detail of the lever and quadrant.

Figure 5 is an enlarged detail of the lamp mounting.

Figure 6 is a detail perspective view illustrating the manner of mounting the stop plate.

Like numerals of reference indicate corresponding parts in the various figures.

Referring to the drawings, the shaft 1 extending across the car in front of the radiator and intermediate of the height of the engine hood, is supported in the brackets 2 and 3 carrying at their upper ends the bearings 4 and 5 in which said shaft is journalled.

The brackets 2 and 3 are of conventional design and are bolted to reinforcing bars under the mudguards and extend upwardly therefrom.

The crank 6 is clamped to the shaft 1 between the brackets 2 and 3 and is pivotally secured to the connecting rod 7, which extends through the engine hood and through the dash 8.

The quadrant 9 is in the form of an arc-shaped bar 10 pivotally secured to the lugs 11 projecting from the plate 12, the latter being bolted to the dash 8. The lugs 13 also projecting from the plate 12 form the pivot bearing for the bell crank lever 14, the short section 15 of which is pivotally secured to the connecting rod 7, while the long section 16 extends into the handle 17 terminating at or about the instrument board of the car.

The long section 16 is longitudinally slotted at 18 and the quadrant bar 10 is inserted through said slot and anchored by the spring 19 to the dash 8.

The roller 20 journalled within the slot 18 forms a guide for the lever in its operation on the quadrant bar 10, the latter being notched at 21, 22 and 23 for the roller 20, which thus afford three positions.

The lamps 24 and 25 are mounted respectively at opposite ends of the shaft 1 and the sockets 26 and 27 are provided for this purpose, these sockets being clamped to said shaft and the lamps secured therewith. The stop and guide extensions 28 from the plates 29 secured with said lamps extend along the shaft 1 and follow said shaft in rotation.

The extension 28 of the stop plate 29 is arranged to engage a shoulder 30 of the bearing bracket to limit the upward movement of the lamps.

In the operation the lever handle 17 is pressed downwardly and this turns the bell crank on its pivot and pushes the connecting rod and turns the shaft 1 to dip the lights thereby eliminating the glare ahead and directing the rays to the front wheels and the ground. The roller in the lever slot travels from notch to notch taking the position given, so that in the final position only a very narrow slit of light appears from ahead of the car. This can be arranged according to the needs of the occasion.

In the final dipped position the lever is arrested by the stop 30 so that the lights remain steady in their adjusted position.

What I claim is:—

1. In automobile headlights, a shaft extending across the car in front of the engine hood, brackets secured in the vehicle frame and having bearings at their upper ends for said shaft, sockets clamped to said shaft, lamps mounted in the sockets, a crank on said shaft, a connecting rod from said crank, a bell crank lever pivotally mounted and secured to said connecting rod, and a pivoted spring controlled member cooperating with the lever for automatically locking the same and the lamps in their adjustment.

2. In automobile headlights, a shaft extending across the car in front of the engine hood, brackets secured to the vehicle frame and having bearings for the said shaft, sockets clamped to the shaft, lamps mounted in the sockets, a crank on said shaft, a connecting rod from said crank, a bell crank lever pivotally mounted on and provided with a relatively short arm pivotally secured to the connecting rod and adapted to be arranged in parallelism and in overlapping relation with the said connecting rod to form a lock and a pivoted spring controlled member cooperating with the lever for automatically locking the same and the lamps in their adjustment.

3. In automobile headlights, a shaft extending across the car in front of the engine hood, brackets secured to the vehicle frame and having bearings for said shaft, sockets clamped to said shaft, lamps mounted in the sockets, a crank on said shaft, operating mechanism connected with the shaft for rotating the same to adjust the lamps and cooperating means on the said sockets and on the brackets for limiting the rotary movement of the shaft for forming a stop for the lamps.

4. In automobile headlights, a shaft extending across the car in front of the engine hood, brackets secured to the frame and having bearings receiving the said shaft, said brackets being also provided with a shoulder, lamp sockets clamped to the shaft and provided with a stop plate having an extension arranged to be carried into and out of engagement with the shoulder of the bracket by the rotary movement of the shaft, and lamps mounted in the said sockets.

Signed at Montreal, Canada this 24th day of March 1924.

GEORGE PIERCE.